United States Patent
Cordiale

(10) Patent No.: US 6,700,233 B2
(45) Date of Patent: Mar. 2, 2004

(54) BRUSHLESS ELECTRIC MOTOR

(76) Inventor: Frank Cordiale, 1695 Marvel, Reno, NV (US) 89502

( * ) Notice: Subject to any disclaimer, the term of this patent is extended or adjusted under 35 U.S.C. 154(b) by 25 days.

(21) Appl. No.: 09/731,637

(22) Filed: Dec. 7, 2000

(65) Prior Publication Data
US 2002/0070613 A1 Jun. 13, 2002

(51) Int. Cl.$^7$ ................................................ H02K 33/12
(52) U.S. Cl. ........................................ 310/24; 417/416
(58) Field of Search ............................ 310/23, 24, 30, 310/34, 35; 417/320, 416, 417, 418

(56) References Cited

U.S. PATENT DOCUMENTS

| | | | | |
|---|---|---|---|---|
| 3,859,547 A | * | 1/1975 | Massie | 310/14 |
| 4,010,390 A | * | 3/1977 | Stampfli | 310/30 |
| 4,204,158 A | * | 5/1980 | Ricouard | 324/208 |
| 4,295,066 A | * | 10/1981 | Lloyd et al. | 310/30 |
| 4,321,020 A | * | 3/1982 | Mittal | 417/320 |
| 4,389,169 A | * | 6/1983 | De Dionigi | 417/417 |
| 4,507,579 A | * | 3/1985 | Turner | 310/23 |
| 4,510,420 A | * | 4/1985 | Sasso | 318/37 |
| 4,574,644 A | * | 3/1986 | Lew et al. | 73/861.05 |
| 5,057,724 A | * | 10/1991 | Patton | 310/17 |
| 5,203,172 A | * | 4/1993 | Simpson et al. | 60/545 |
| 5,457,349 A | * | 10/1995 | Gifford | 310/24 |
| 5,798,582 A | * | 8/1998 | Neff | 310/13 |
| 5,923,111 A | * | 7/1999 | Eno et al. | 310/156 |
| 6,020,661 A | * | 2/2000 | Trago et al. | 310/43 |
| 6,049,146 A | * | 4/2000 | Takara | 310/24 |

FOREIGN PATENT DOCUMENTS

| | | | |
|---|---|---|---|
| DE | 24 11 899 A1 | * | 9/1975 |
| FR | 2 666 627 A1 | * | 9/1990 |

* cited by examiner

Primary Examiner—Burton S. Mullins
Assistant Examiner—Judson H. Jones
(74) Attorney, Agent, or Firm—John D. Long

(57) ABSTRACT

A prime mover using a split coil for magnetically inducing movement of a steel piston. The magnetic effects are emphasized in higher reciprocating movement by the proximate introduction of a permanent magnet. The prime mover is sparkless, brushless, quiet, low friction, and can operate on a wide array of voltages, including high frequency very low voltage signals.

3 Claims, 4 Drawing Sheets

BRUSHLESS ELECTRIC MOTOR

BACKGROUND

1. Field of Invention

This invention relates generally to the field of electromagnetic prime movers.

2. Description of the Prior Art

The prior art includes inductors and some prime movers with singular coils. The problem with singular coils is reversing the current causes heat loss and control problems. The Inventor's approach uses a single cylinder with two separate coils which are controlled with on/off switches. Thus, the current is merely interrupted and not reversed, resulting in lower heat losses and a more efficient engine.

SUMMARY & OBJECTS OF THE INVENTION

A first object of the invention is to provide an electric-powered prime mover.

A second object of the invention is to provide an electric motor that will operate submersed in fluid.

A third object of the invention is to provide a quiet piston motor.

A fourth object of the invention is to provide a low friction loss motor.

A fifth object of the invention is to provide a magnetically stimulated electric system for reciprocating a mass.

DESCRIPTION OF PREFERRED EMBODIMENT

Figure 1:
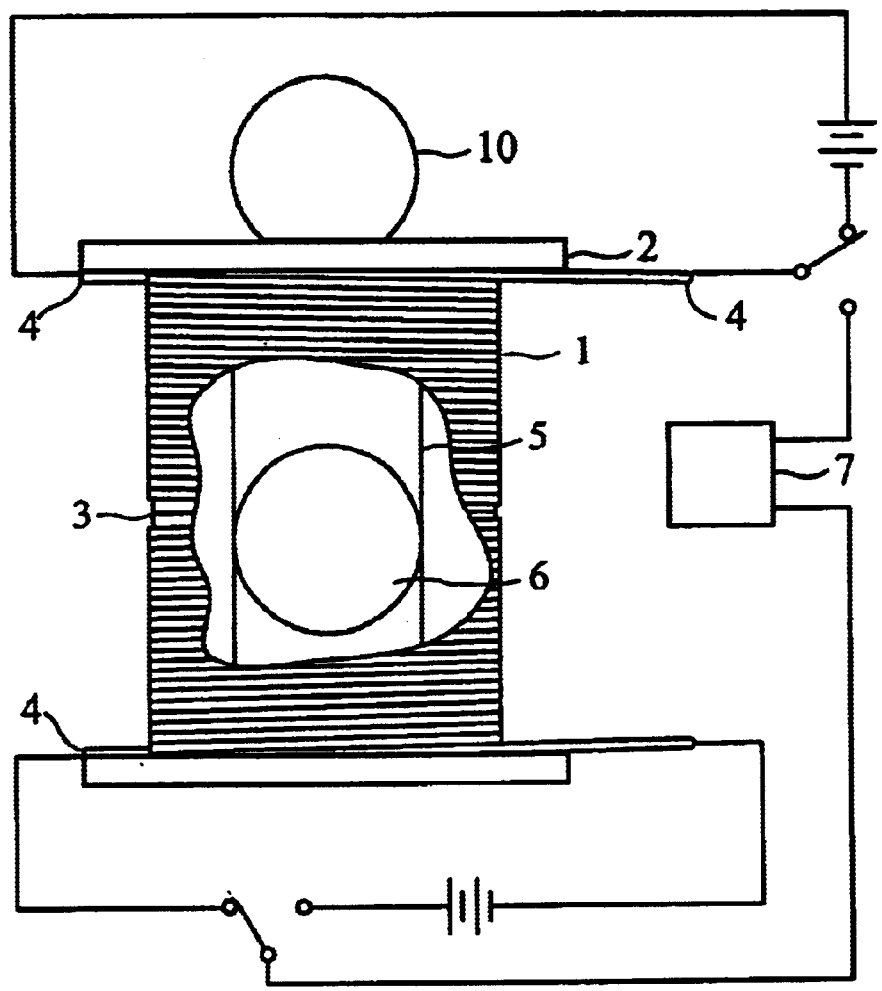
FIG. 1 is a cutaway view of the coil.

The coil 1 is shown in FIG. 1. The structure 2 is a high temperature plastic cylinder with a middle divider 3 or, alternatively, could, be two cylinders mounted together. The top and bottom are wound separately with copper wires. The result is a "split coil". Many prior art attempts have used a single coil, but they suffer from limited piston travel and must be moved to a starting position by manual or alternate means.

Figure 2:
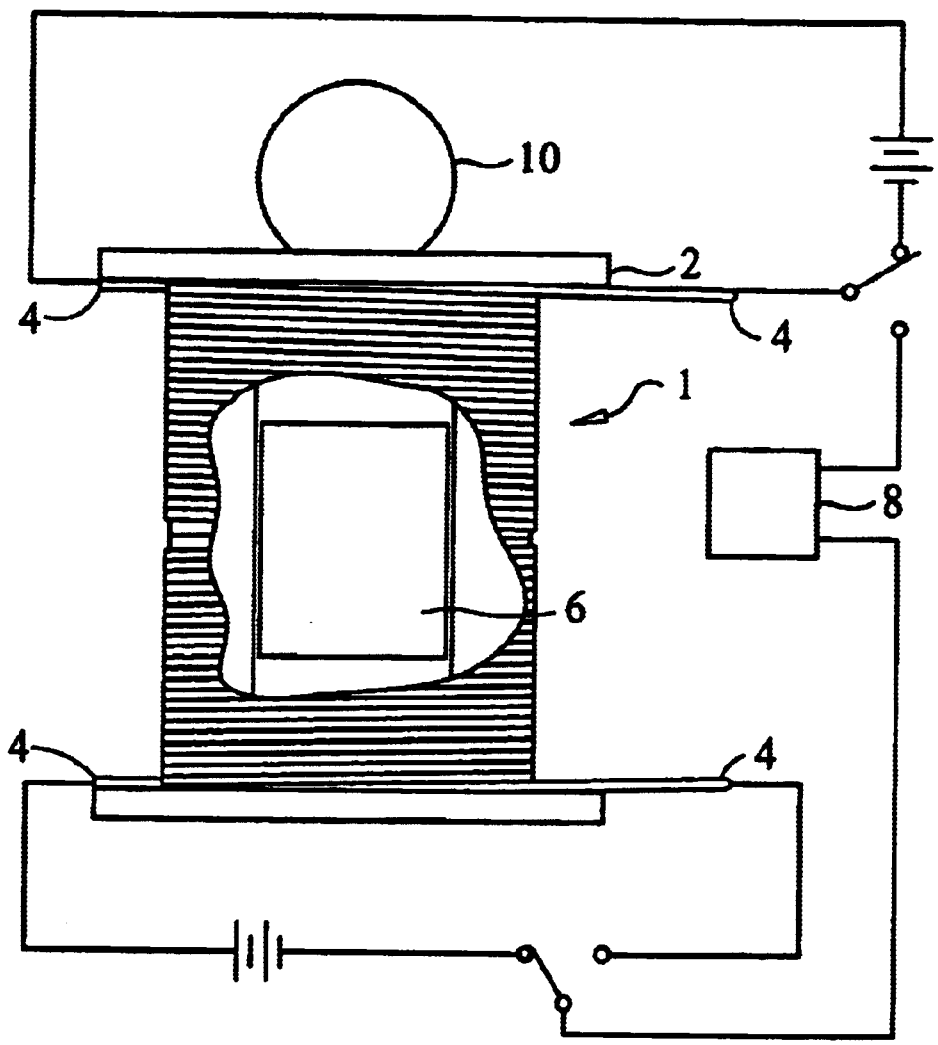
FIG. 2 is an alternate embodiment.
Figure 3:
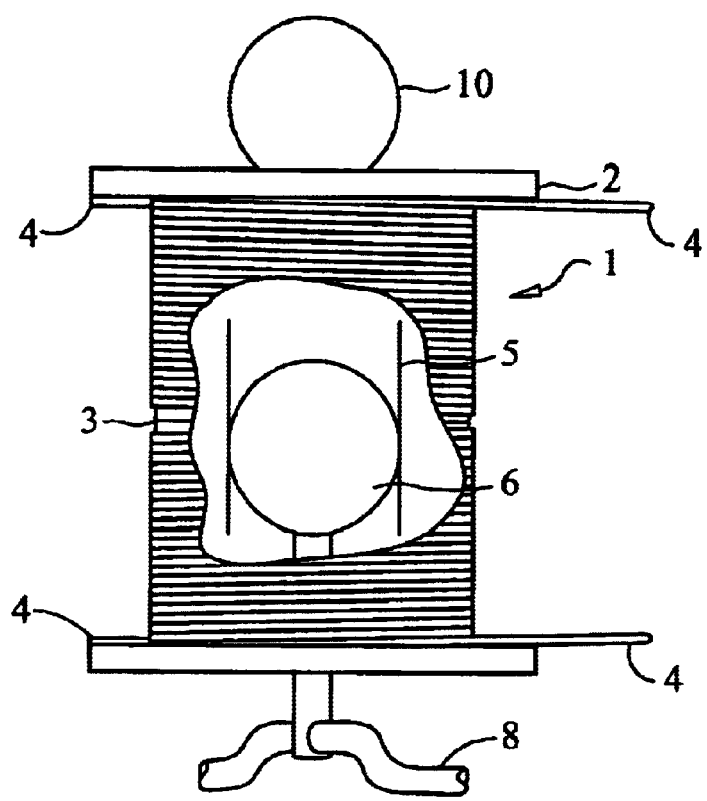
FIG. 3 is an alternate embodiment.
Figure 5:
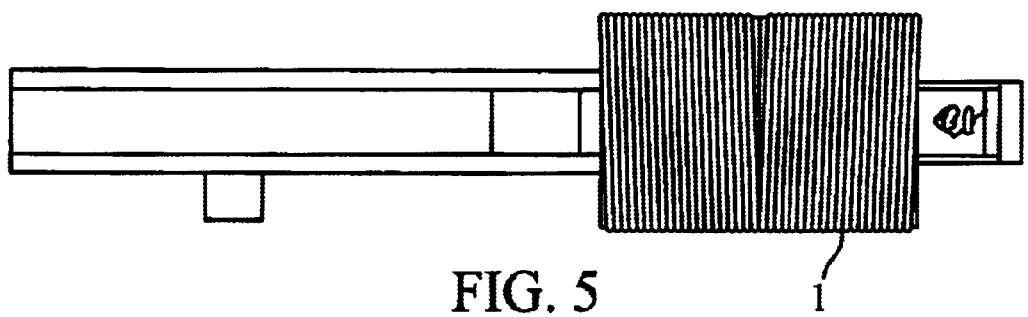
FIG. 5 is another alternate embodiment.
Figure 4:
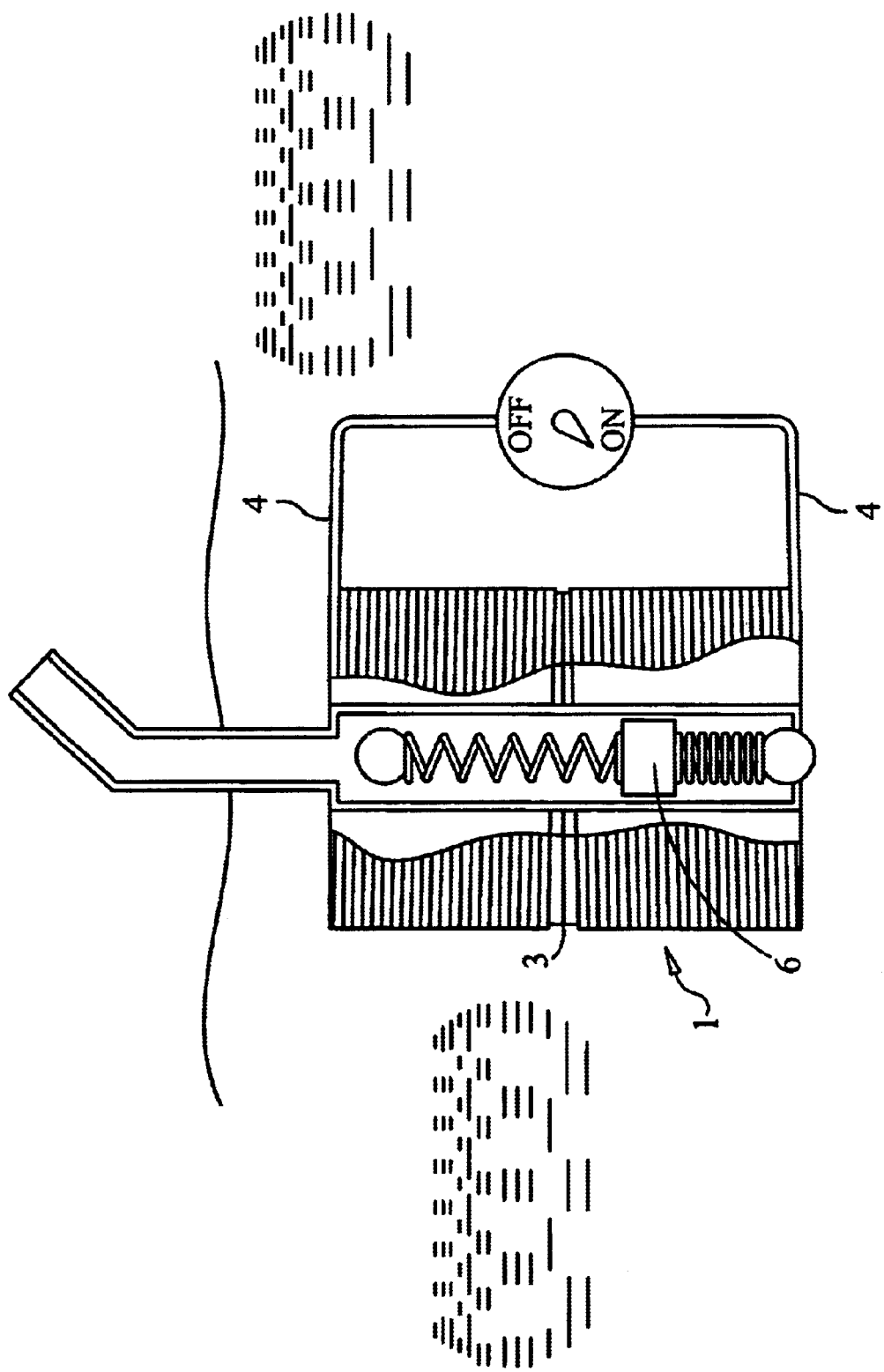
FIG. 4 is a pump.

The coil has windings exiting at the top and bottom, as each of the two coils is entirely separate; each also has a terminus at the middle. In an alternate embodiment, both terminus for each coil are wound outwardly again so that all connections 4 are at the corresponding top or bottom of the split coil. The wound coil slides axially over a brass cylinder 5. Inside the cylinder a steel piston 6 is centrally located along the longitudinal axis. The piston can be a short cylindrical shape FIG. 2 or a spherical shape.

The coils are energized with electric current and the law of induction moves the mass, depending on the direction of the current and the direction of the windings. These windings are wound clockwise at the top and counter clockwise at the bottom. Voltage is applied to one of the coils to draw the piston toward that end of the cylinder. That current is cut off by a switch and current is applied to the coil at the opposite end. The piston mass is thus pulled in the opposite direction and the current in that coil is switched off and the current in the first coil is reenergized to cause the piston to return.

This process is repeated. The switches are actuated by sensitive metal detectors 7 or, in an alternate embodiment, can be timed 8 or can be based upon the motion of a connecting rod 9 attached to the piston. This prime mover provides numerous advantages. 1) the motor is sparkless; 2) the motor is brushless; 3) the motor's cylinder can be replaced without remanufacturing the windings; 4) the motor is capable of operating at high voltage, low voltage, or even extremely low voltages such as those that are battery generated; 5) changing the coil can change the characteristics of the motor. The motor can be operated in volatile gas environments like hydrogen or oxygen. Because there is no cylinder pressure to drive the piston, the motor can be operated in high pressure environments such as under the sea or on Venus or Jupiter, and low pressure environments like space. The motor can be accelerated substantially by placing a permanent magnet 10 near an end of the cylinder. The speed of the reciprocation is increased due to the eccentricity of the magnetic field generated by the coils, as long as the cylinder is aligned concentrically with the coil. The piston floats centrally with very low cylinder contact and, consequently, wear.

In an alternate embodiment the coil frame could be made from granite or crystal to emphasize the magnetic effects.

This motor can be used solo or in tandem with other split coils to run a crank shaft to perform work.

This motor can be used as a pump by having the piston pressurize a chamber and force fluid out of the chamber. The chamber has a port to accept fluid to be pumped, which is passed by the normal motion.

In another embodiment the piston is reciprocated and released by switching off the coil and projected out of the cylinder along its axis.

Obviously, numerous (additional) modifications and variations of the present invention are possible in light of the above teachings. It is, therefore, to be understood that within the scope of the appended claims, the invention may be practiced otherwise than as specifically described herein.

What is claimed is:

1. An electric motor comprising a frame work with at least one cylinder, a portion of which is covered with at least two windings, a piston disposed axially concentric within the cylinder of said frame work, a power source for energizing said windings with an electric current which induces said piston to move axially toward the center position of that portion of the cylinder covered by an energized winding, at least one switch for controlling the energy flow in each of the said windings wherein said piston reciprocates based upon the alternate energization of said windings, and exits that portion of said cylinder wrapped by a winding when that winding is not energized during a cycle.

2. An electric motor of claim 1, wherein the most outward movement of the piston travel is kept within that portion of the framework covered by windings.

3. An electric motor of claim 1, wherein at least one permanent magnet is placed near at least one end of the cylinder so that the permanent magnet is not in physical contact with either the cylinder or piston.

* * * * *